United States Patent
Folkersen

(10) Patent No.: US 11,697,280 B2
(45) Date of Patent: Jul. 11, 2023

(54) MULTI-PART UNDERLAYMENT AND METHOD OF MANUFACTURE

(71) Applicant: Roofers' Advantage Products, LLC, E. Wakefield, NH (US)

(72) Inventor: Jonny E. Folkersen, East Wakefield, NH (US)

(73) Assignee: Roofers' Advantage Products, LLC, E. Wakefield, NH (US)

(*) Notice: Subject to any disclaimer, the term of this patent is extended or adjusted under 35 U.S.C. 154(b) by 0 days.

(21) Appl. No.: 17/473,336

(22) Filed: Sep. 13, 2021

(65) Prior Publication Data

US 2022/0081908 A1    Mar. 17, 2022

Related U.S. Application Data

(60) Provisional application No. 63/077,129, filed on Sep. 11, 2020.

(51) Int. Cl.
| | | |
|---|---|---|
| *B32B 38/18* | (2006.01) | |
| *E04D 12/00* | (2006.01) | |
| *B32B 37/12* | (2006.01) | |
| *B32B 38/00* | (2006.01) | |

(52) U.S. Cl.
CPC .............. *B32B 38/18* (2013.01); *B32B 37/12* (2013.01); *B32B 38/0004* (2013.01); *E04D 12/002* (2013.01); *B32B 2419/06* (2013.01)

(58) Field of Classification Search
CPC ...... B32B 37/20; B32B 38/0004; B32B 38/18
See application file for complete search history.

(56) References Cited

U.S. PATENT DOCUMENTS

| | | | | |
|---|---|---|---|---|
| 7,132,143 B2* | 11/2006 | Zanchetta | ............... | B32B 27/32 |
| | | | | 428/41.5 |
| 2004/0127120 A1* | 7/2004 | Zanchetta | ............... | B32B 27/12 |
| | | | | 442/41 |
| 2011/0104461 A1* | 5/2011 | Grubka | ................. | E04D 12/002 |
| | | | | 428/206 |

\* cited by examiner

*Primary Examiner* — Philip C Tucker
*Assistant Examiner* — John Blades
(74) *Attorney, Agent, or Firm* — Maine Cernota & Rardin

(57) ABSTRACT

A multipart underlayment having a cap sheet and base sheet combined to form a pocket for securely holding building materials and environmentally-friendly manufacturing method for manufacturing the same.

13 Claims, 8 Drawing Sheets

MULTI-PART UNDERLAYMENT AND METHOD OF MANUFACTURE

RELATED APPLICATIONS

This application claims the benefit of U.S. Provisional Application No. 63/077,129, filed Sep. 11, 2020. This application is herein incorporated by reference, in its entirety, for all purposes.

FIELD OF THE DISCLOSURE

The following disclosure relates generally to underlayments and, more specifically, to multi-part underlayments for use in roofing applications and methods of manufacture thereof.

BACKGROUND

Wind-driven rain and ice dam related roof failures are currently mitigated using a variety of self-adhesive products, commonly known as underlayment, in combination with metal flashing. The self-adhesive products are typically offered in roll form and, once unrolled, create a sheet onto which roofing products can be installed.

Metal flashing components used in conjunction with underlayment are typically made of aluminum. While aluminum nails do exist, the nails most often used to secure flashing to a building envelope are made of galvanized steel. Under atmospheric conditions of moderate to mild humidity, contact between a galvanized surface and aluminum is unlikely to cause substantial incremental corrosion. Under very humid conditions, however, the interface between the galvanized nail and the aluminum flashing will experience greatly accelerated corrosion, unless electrically isolated from the aluminum.

Furthermore, water leaks into a building envelope are a primary consideration when constructing a roof. To this end, existing metal flashing is typically placed directly on top of an underlayment. However, any moisture that is able to penetrate the shingles or other outer roof layer may also penetrate the interface between the metal flashing and underlayment, allowing moisture to flow into areas in which it may cause issues. To prevent this, many roofers will utilize a roof cement at this interface, however, this application of the roofing cement results in roofing delays and the cure time for such product results in further delays. Roofing cement is also susceptible to improper application and may not cure well in certain weather conditions.

Some roofers will mount metal flashing underneath the underlayment to avoid the use of roofing cement, however, this technique introduces other problems, including nails being placed through the top side of the underlayment and into flashing components, causing lacerations in the underlayment that can allow water to infiltrate the building envelope. Furthermore, this application method does not prevent moisture backing up behind the drip edge of metal flashings during weather events, such as ice damming.

Still further, the use of metal flashing (e.g. a metal valley pan) in valleys of a roof is commonplace. However, expansion and contraction of the flashing can cause oil canning when fasteners are driven through the edge of the metal valley pan, as is typical.

Still even further, there is a need, in some cases, to secure building materials opposing each other against water intrusion, wind uplift, and other environmental and installation-related stressors. Currently, no flashing exists that adequately addresses this issue.

Furthermore, when underlayment is manufactured, inefficiencies result in the avoidable destruction and/or waste of raw materials, in the aggregate having a significant impact on the environment.

What is needed, therefore, is an apparatus, system, and/or method that allows galvanized nails to be used with aluminum flashing, that removes the need for roofing cement while maintaining a water-tight building envelope, reducing or eliminating defects associated with the installation of metal flashing (e.g. oil canning), that provides enough flexibility to be used at various locations where such characteristics are desirable, and that can be manufactured without significant waste.

SUMMARY

By creating a sandwich-style underlayment that isolates the portion of galvanized fasteners in contact with aluminum flashing from moisture and/or contact, a long-lasting structure can be created, without requiring the use of roofing cement.

Embodiments provide for the elimination of fasteners altogether, preventing fastener-related defects (e.g. oil canning) from occurring.

Still further embodiments provide a flashing having two opposing cavities, which can be used to securely retain opposing, nearby building materials and/or otherwise prevent moisture intrusion at an interface between such materials or portions of a building structure.

In embodiments, during manufacturing, a temporary release liner is used to allow either a base sheet or cap sheet to be rolled and is then removed when the base sheet and cap sheet are joined, with the remaining release liner allowing the underlayment to be stored in a roll form without the base and cap sheets adhering to one another.

One embodiment of the present disclosure provides a method of manufacture of a multi-part underlayment comprising a base sheet and a cap sheet that are combined to create a double layer hinge section as well as a single-layer nose section extending from the cap sheet, creating a pocket for holding flashing and the like, the method comprising: producing the base sheet by: providing a carrier support sheet contained on a first base sheet roller; feeding the carrier support sheet through a series of rollers configured to place the carrier support sheet under tension; coating the carrier support sheet in a pressure sensitive adhesive; cooling the carrier support sheet; applying a base sheet release liner held by a second base sheet roller to the carrier support sheet; sizing the carrier support sheet to a predetermined size using at least one pair of base sheet sizing rollers; and winding the newly formed base sheet on a base sheet winding roll; producing a cap sheet by: providing a carrier support sheet contained on a first cap sheet roller; feeding the carrier support sheet through a series of rollers configured to place the carrier support sheet under tension; coating the carrier support sheet in a pressure sensitive adhesive; cooling the carrier support sheet; applying a cap sheet release liner held by a second cap sheet roller to the carrier support sheet; applying a temporary cap sheet release liner held by a third cap sheet roller to the carrier support sheet; sizing the carrier support sheet to a predetermined size using at least one pair of cap sheet sizing rollers; and winding the newly formed cap sheet on a cap sheet winding roll; producing the multi-part underlayment by: feeding the base sheet held on the base sheet winding roll through a series of rollers configured to place the base sheet under tension; stripping the cap sheet held on the cap sheet winding roll of its temporary release liner using a temporary release liner recovery roller to recover the release liner; combining the cap sheet with the base sheet under pressure using at least one pair of final product sizing rollers; and slitting the newly-formed multi-part underlayment into desired widths.

Another embodiment of the present disclosure provides such a method, further comprising winding the multi-part underlayment on a winding roll.

Still another embodiment of the present disclosure provides such a method wherein the pressure sensitive adhesive is Butyl.

Still yet another embodiment of the present disclosure provides such a method wherein the pressure sensitive adhesive is Bitumen.

Even still yet another embodiment of the present disclosure provides such a method wherein the cap sheet release liner, base sheet release liner, and/or temporary cap sheet release liner are made of plastic.

Even yet still another embodiment of the present disclosure provides such a method wherein the plastic is a polyester.

Even yet another embodiment of the present disclosure provides such a method wherein the polyester comprises at least one siliconized, non-stick surface.

Even still yet another embodiment of the present disclosure provides such a method wherein the plastic is a double siliconized polyester-based sheet.

Still yet even another embodiment of the present disclosure provides such a method further comprising folding the cap sheet release liner back onto itself where it meets the pressure-sensitive adhesive, exposing part of the underside of the cap sheet release liner to a top side of the base sheet.

One embodiment of the present disclosure provides a method of manufacture of a multi-part underlayment comprising a base sheet and a cap sheet that are combined to create a double layer hinge section as well as a single-layer nose section extending from the cap sheet, creating a pocket for holding flashing and the like, the method comprising: producing a base sheet by: providing a carrier support sheet contained on a first base sheet roller; feeding the carrier support sheet through a series of rollers configured to place the carrier support sheet under tension; coating the carrier support sheet in a neutralized pressure sensitive adhesive; cooling the carrier support sheet; sizing the carrier support sheet to a predetermined size using at least one pair of base sheet sizing rollers; and winding the newly formed base sheet on a base sheet winding roll; producing a cap sheet by: providing a carrier support sheet contained on a first cap sheet roller; feeding the carrier support sheet through a series of rollers configured to place the carrier support sheet under tension; coating the carrier support sheet in a neutralized pressure sensitive adhesive; cooling the carrier support sheet; sizing the carrier support sheet to a predetermined size using at least one pair of cap sheet sizing rollers; and winding the newly formed cap sheet on a cap sheet winding roll; producing the multi-part underlayment by: feeding the base sheet held on the base sheet winding roll through a series of rollers configured to place the base sheet under tension; reactivating the neutralized pressure sensitive adhesive; combining the cap sheet with the base sheet under pressure using at least one pair of final product sizing rollers; and slitting the newly-formed multi-part underlayment into desired widths.

Another embodiment of the present disclosure provides such a method further comprising winding the multi-part underlayment on a winding roll.

Still another embodiment of the present disclosure provides such a method wherein the cap sheet release liner, base sheet release liner, and/or temporary cap sheet release liner are made of plastic.

Still yet another embodiment of the present disclosure provides such a method wherein the plastic is a polyester.

Still even yet another embodiment of the present disclosure provides such a method wherein the polyester comprises at least one siliconized, non-stick surface.

Even yet still another embodiment of the present disclosure provides such a method wherein the plastic is a double siliconized polyester-based sheet.

Yet still even another embodiment of the present disclosure provides such a method further comprising folding the cap sheet release liner back onto itself where it meets the pressure-sensitive adhesive, exposing part of the underside of the cap sheet release liner to a top side of the base sheet.

One embodiment of the present disclosure provides a method of manufacture of a multi-part underlayment comprising a base sheet and a cap sheet that are combined to create a double layer hinge section as well as a single-layer nose section extending from the cap sheet, creating a pocket for holding flashing and the like, the method comprising: producing a base sheet by: providing a carrier support sheet contained on a first base sheet roller; feeding the carrier support sheet through a series of rollers configured to place the carrier support sheet under tension; coating the carrier support sheet in a pressure sensitive adhesive; cooling the carrier support sheet; applying a base sheet release liner held by a second base sheet roller to the carrier support sheet; and sizing the carrier support sheet to a predetermined size using at least one pair of base sheet sizing rollers, creating the base sheet; producing a cap sheet by: providing a carrier support sheet contained on a first cap sheet roller; feeding the carrier support sheet through a series of rollers configured to place the carrier support sheet under tension; coating the carrier support sheet in a pressure sensitive adhesive; cooling the carrier support sheet; applying a cap sheet release liner held by a second cap sheet roller to the carrier support sheet; applying a temporary cap sheet release liner held by a third cap sheet roller to the carrier support sheet; and sizing the carrier support sheet to a predetermined size using at least one pair of cap sheet sizing rollers, creating a cap sheet; producing the multi-part underlayment by: feeding the base sheet through a series of rollers configured to place the base sheet under tension; stripping the cap sheet of its temporary release liner using a temporary release liner recovery roller to recover the release liner; combining the cap sheet with the base sheet under pressure using at least one pair of final product sizing rollers; and slitting the newly-formed multi-part underlayment into desired widths.

Another embodiment of the present disclosure provides such a method wherein the base sheet and cap sheet are formed and combined using stacked manufacturing equipment.

Even another embodiment of the present disclosure provides such a method further comprising folding the cap sheet release liner back onto itself where it meets the pressure-sensitive adhesive, exposing part of the underside of the cap sheet release liner to a top side of the base sheet.

Even still yet another embodiment of the present disclosure provides such a method wherein the cap sheet release liner, base sheet release liner, and/or temporary cap sheet release liner are made of polyester-based plastic.

The features and advantages described herein are not all-inclusive and, in particular, many additional features and advantages will be apparent to one of ordinary skill in the art in view of the drawings, specification, and claims. Moreover, it should be noted that the language used in the specification has been selected principally for readability and instructional purposes and not to limit the scope of the inventive subject matter.

These and other features of the present embodiments will be understood better by reading the following detailed description, taken together with the figures herein described. The accompanying drawings are not intended to be drawn to scale. For purposes of clarity, not every component may be labeled in every drawing.

DETAILED DESCRIPTION

Figure 1:
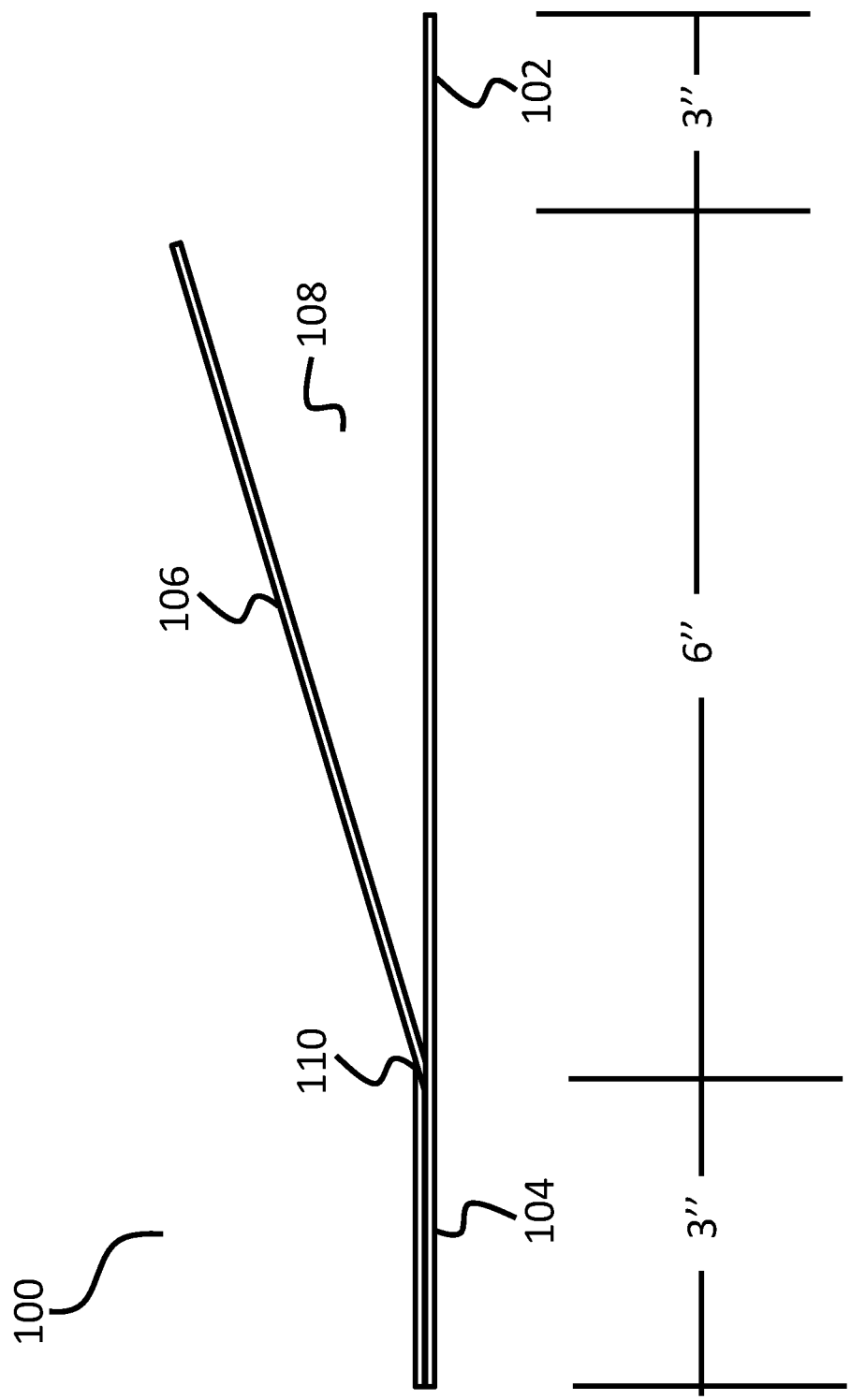
FIG. 1 is a side elevation view of a multi-part underlayment, in accordance with embodiments of the present disclosure.
Figure 2:
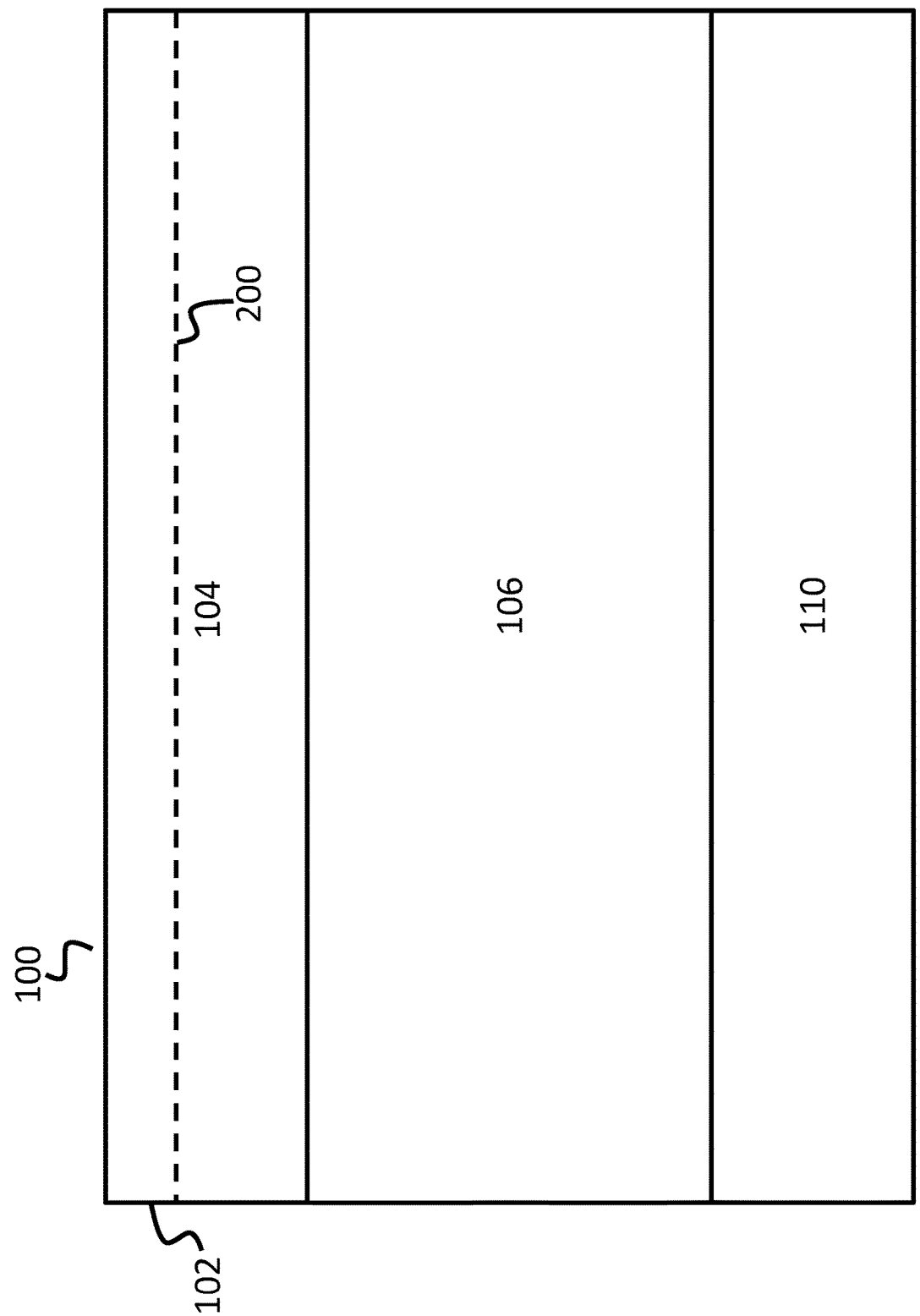
FIG. 2 is a top elevation view of a multi-part underlayment, in accordance with embodiments of the present disclosure.

Now referring to FIGS. 1 and 2, a side elevation view and a top view, respectively, of a multi-part underlayment 100, in accordance with embodiments of the present disclosure, is depicted. The multi-part underlayment 100, in embodiments includes a double layer hinge 110 section as well as a single-layer nose 102, i.e. an extension of a base sheet 104, in embodiments extending 3" from a cap sheet 106. The nose 102 of such embodiments can be partially or fully folded onto a fascia, dependent on the drip edge being used. This design creates a pocket 108, in embodiments extending 6" from a portion adhered to the base sheet 104. In embodiments, the nose 102 itself extends an additional 3" from the pocket 108 in a closed position.

In embodiments, a release liner 300 lines the underside of the cap sheet, which forms a top half of the pocket 108 following the cap sheet's 106 combination with a base sheet 104, as disclosed herein, preventing the cap sheet 106 and base sheet 104 from adhering to one another.

In embodiments, the release liner 300 is made of a plastic, such as polyester, which has at least one siliconized, non-stick surface. In embodiments, for example, the release liner 300 is a double siliconized polyester based sheet or the like, as would be known to one of ordinary skill in the art.

In embodiments, the multi-part underlayment 100 is provided in 12" widths.

In embodiments, such as that shown in FIG. 2, demarcation lines 200 are included on the multi-part underlayment 100 itself to assist installers in determining appropriate underlayment-to-fascia overlap, given the dimensions of a drip edge being used, allowing an installer to install the multi-part underlayment 100 using the top of the fascia or rake trim as a guide. In addition, the demarcation line 200 permits the installer to keep the product running straight across the fascia while installing the multi-part underlayment 100.

Figure 3:
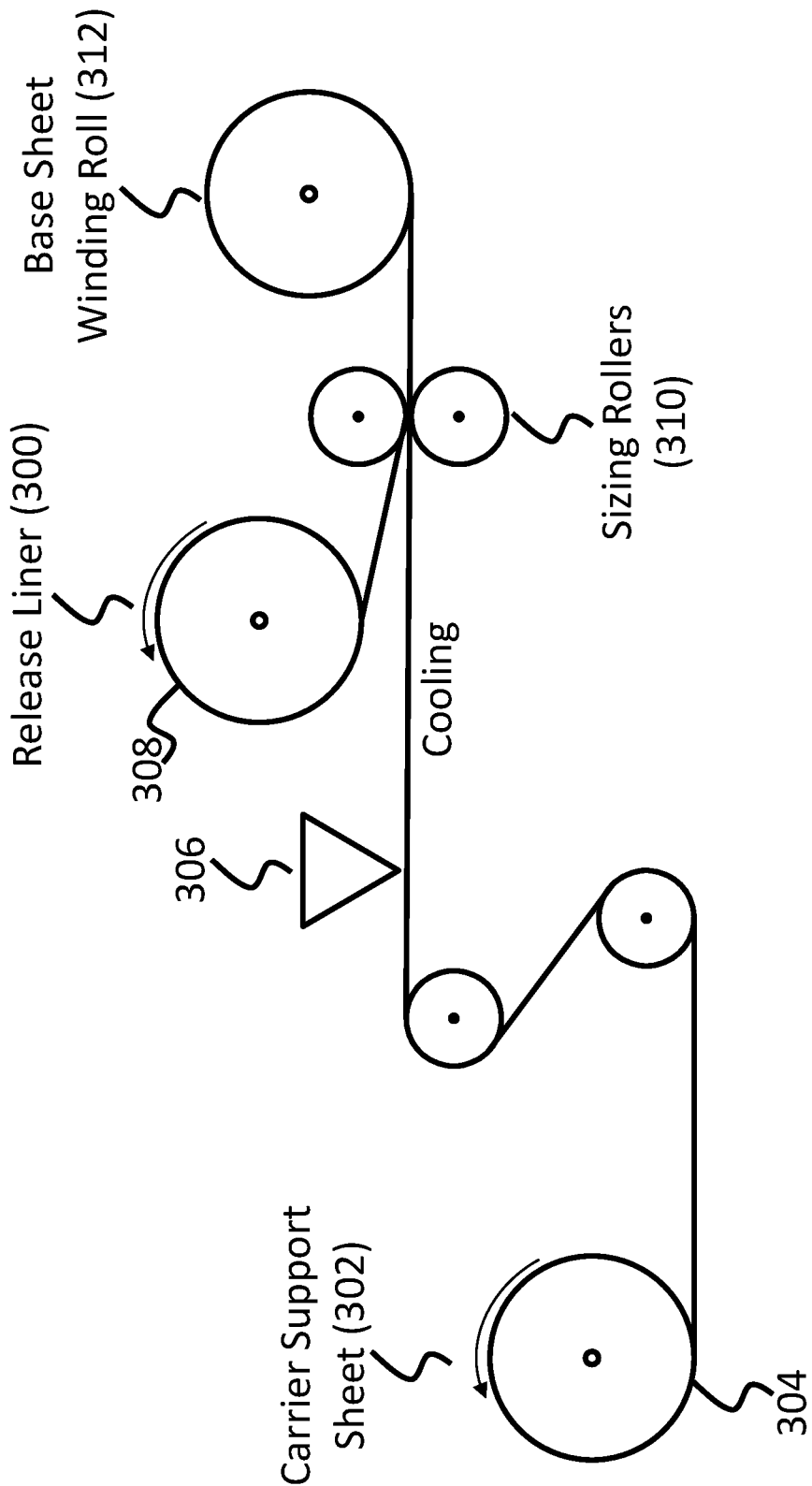
FIG. 3 is a side elevation schematic of a manufacturing line configured to manufacture a base sheet, in accordance with embodiments of the present disclosure.

Now referring to FIG. 3, a side elevation schematic of a manufacturing line configured to manufacture a base sheet 104, in accordance with embodiments of the present disclosure, is depicted. More specifically, a carrier support sheet 302 contained on a first base sheet roller 304 is fed through a series of rollers configured to place the carrier support sheet under tension. The carrier support sheet 302 is then coated in a pressure sensitive adhesive 306, in embodiments Butyl, Bitumen, or the like, before being cooled, having a base sheet release liner 300 held by a second base sheet roller 308 applied, being sized by a pair of base sheet sizing rollers 310, and then being wound on a base sheet winding roll 312.

Figure 4:
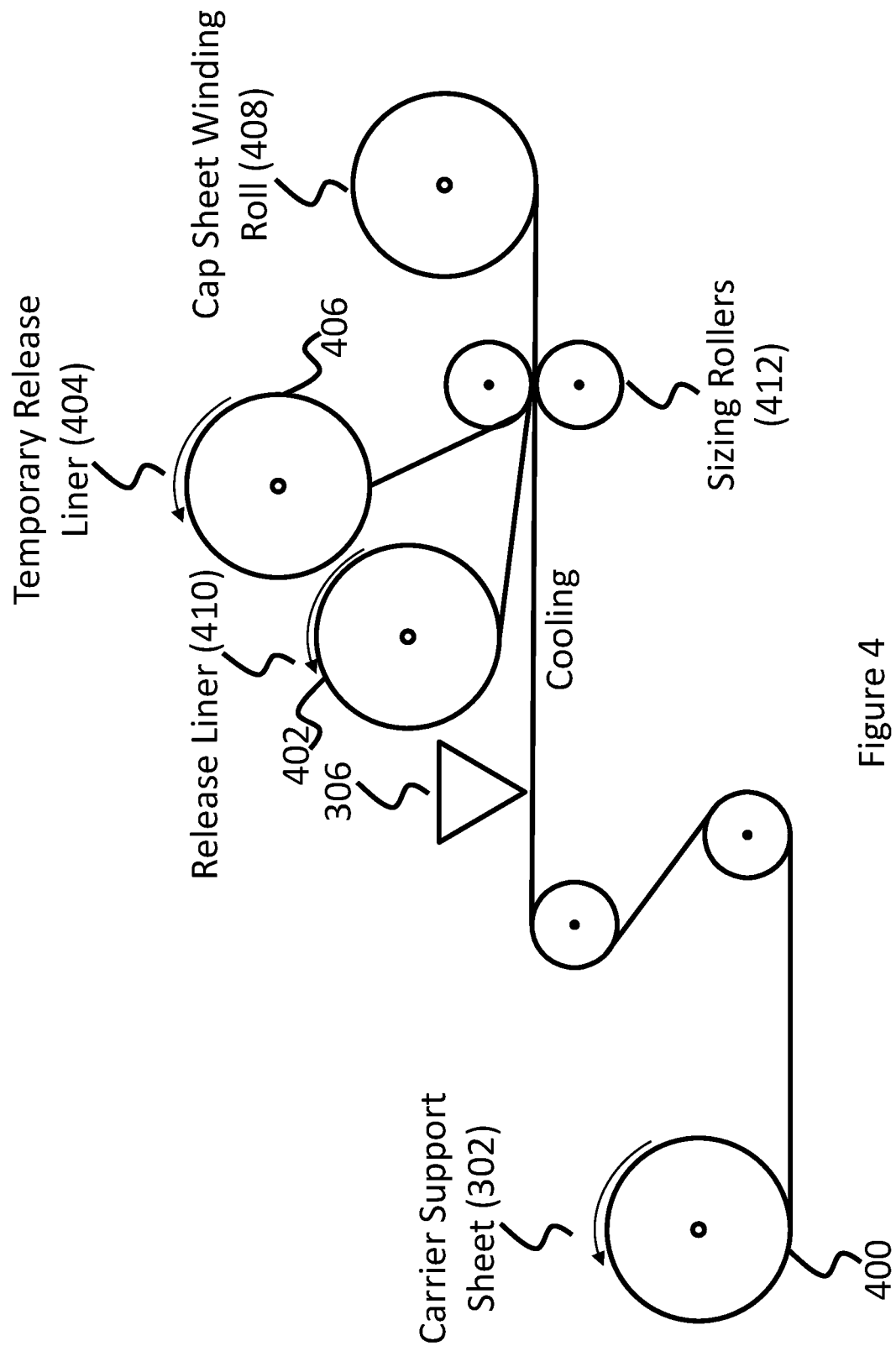
FIG. 4 is a side elevation schematic of a manufacturing line configured to manufacture a cap sheet, in accordance with embodiments of the present disclosure.

Now referring to FIG. 4, a side elevation schematic of a manufacturing line configured to manufacture a cap sheet 106, in accordance with embodiments of the present disclosure, is depicted. More specifically, a carrier support sheet 302 contained on a first cap sheet roller 400 is fed through a series of rollers configured to place the carrier support sheet 302 under tension. The carrier support sheet 302 is then coated in a pressure sensitive adhesive 306, in embodiments Butyl, Bitumen, or the like, before being cooled, having a cap sheet release liner 410 held by a second cap sheet roller 402 applied, having a second, temporary cap sheet release liner 404 held by a third cap sheet roller 406 applied, being sized by a pair of cap sheet sizing rollers 412, and then being wound on a cap sheet winding roll 408.

Figure 5:
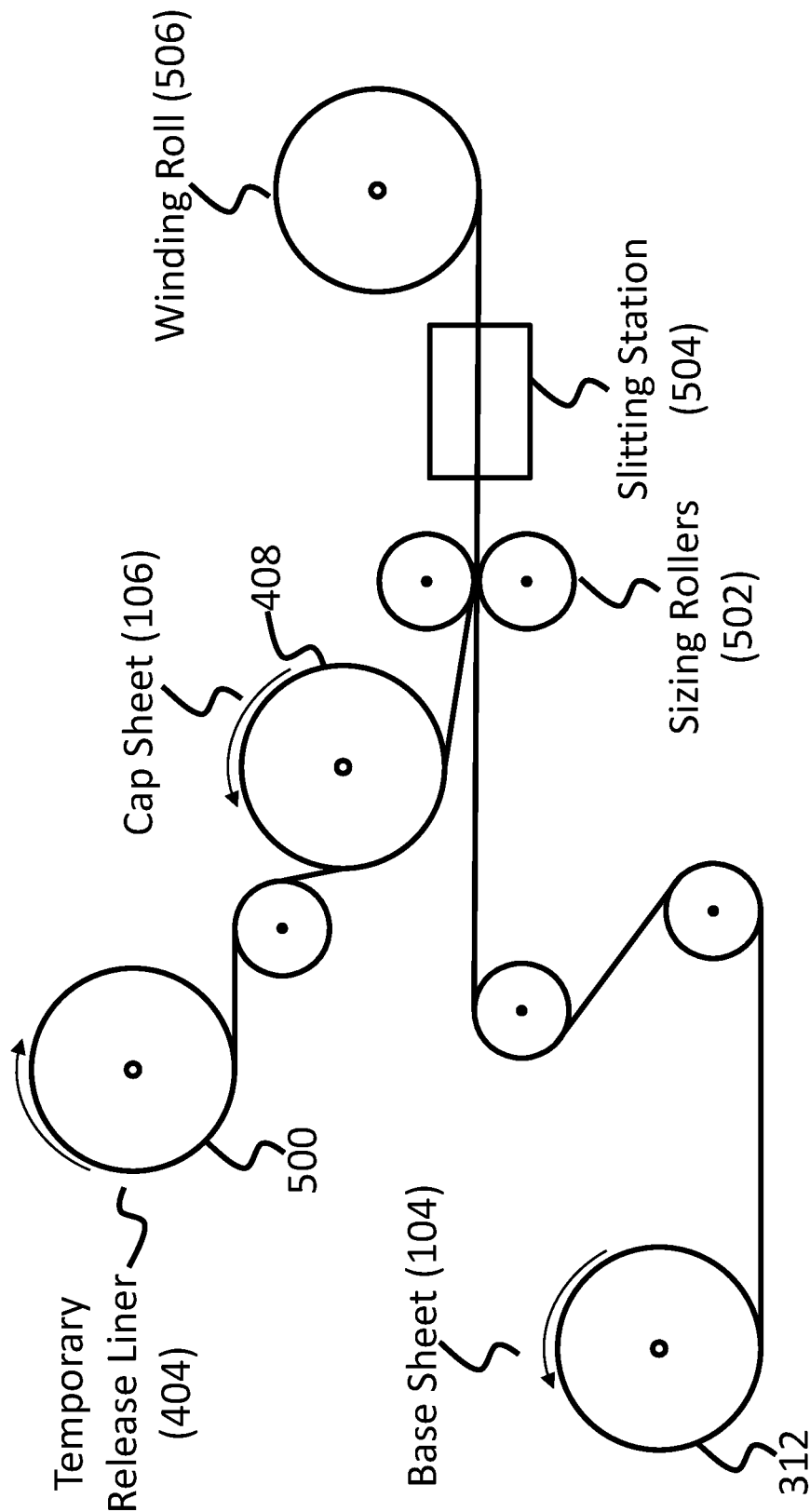
FIG. 5 is a side elevation schematic of a manufacturing line configured to combine a cap sheet and a base sheet, forming a multipart underlayment, in accordance with embodiments of the present disclosure.

Now referring to FIG. 5, a side elevation schematic of a manufacturing line configured to combine a cap sheet 106 and a base sheet 104, forming a multipart underlayment 100, such as that shown in FIG. 1, is depicted. More specifically, a base sheet 104 contained on a base sheet winding roll 312 is fed through a series of rollers configured to place the base sheet 104 under tension. The cap sheet 106, held by a cap sheet winding roll 408 is then stripped of its temporary release liner 404 by a temporary release liner recovery roller 500, allowing the temporary release liner 404 to be reused and that portion of the cap sheet 106 to adhere to the base sheet 104. The cap sheet 106 may then be combined with the base sheet 104 by a pair of final product sizing rollers 502, being slit into desired widths by a slitting station 504, and then being wound on a final product winding roll 506.

Figure 6:
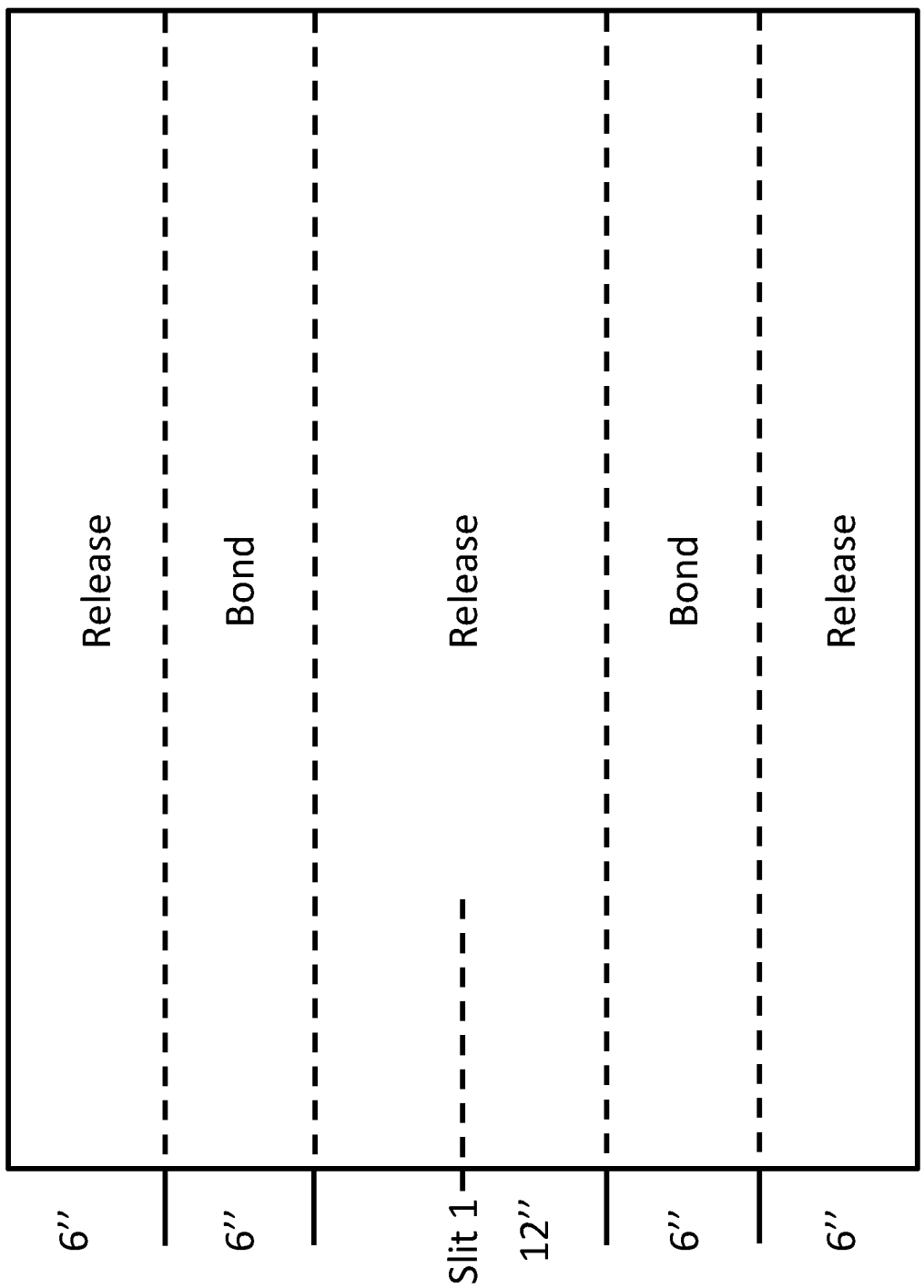
FIG. 6 is a top elevation view showing a cap sheet, in accordance with embodiments of the present disclosure.

Now referring to FIG. 6, a top elevation view showing a cap sheet 106, in accordance with embodiments of the present disclosure, is depicted. In the embodiment depicted in FIG. 5, the cap sheet 106 is manufactured in a 36" width, where the outer 12" are separated into release liner 410 covered sections (outside-most portions) and sections where pressure sensitive adhesive 306 is disposed (6" in from the edges to 12" in from the edges), with the central 12" portion being covered in a release liner 410. Such a cap sheet 106 can be combined with a base sheet 104 of 48" width to create 4 separate multipart underlayments 100, such as that shown in FIG. 1, in a single manufacturing operation, such as that described in the foregoing paragraphs and depicted in FIG. 4.

Figure 7:
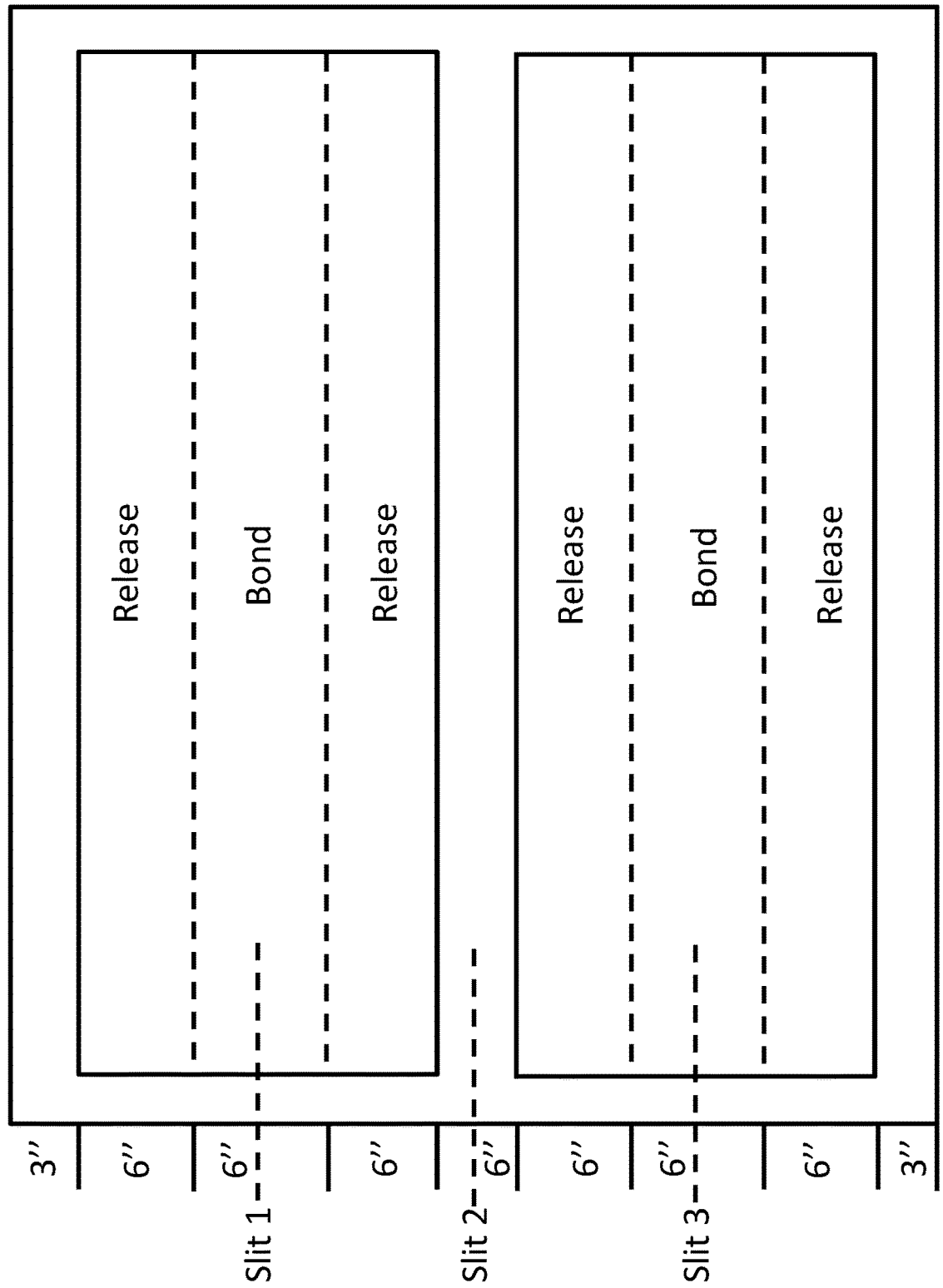
FIG. 7 is a top elevation view showing a combined base and cap sheet, prior to slitting into four separate multipart underlayments, in accordance with embodiments of the present disclosure.

Now referring to FIG. 7, a top elevation view showing a combined base sheet 104 and cap sheet 106, prior to slitting into four separate multipart underlayments 100, in accordance with embodiments of the present disclosure, is depicted. In FIG. 7, a single base sheet 104 is shown with two cap sheets 106, which are bonded to the base sheet 104 by a pressure sensitive adhesive 306. In embodiments, the cap sheets 106 are bonded using a bitumen-based adhesive 306 along a 6" wide portion of the base sheet 104.

Figure 8:
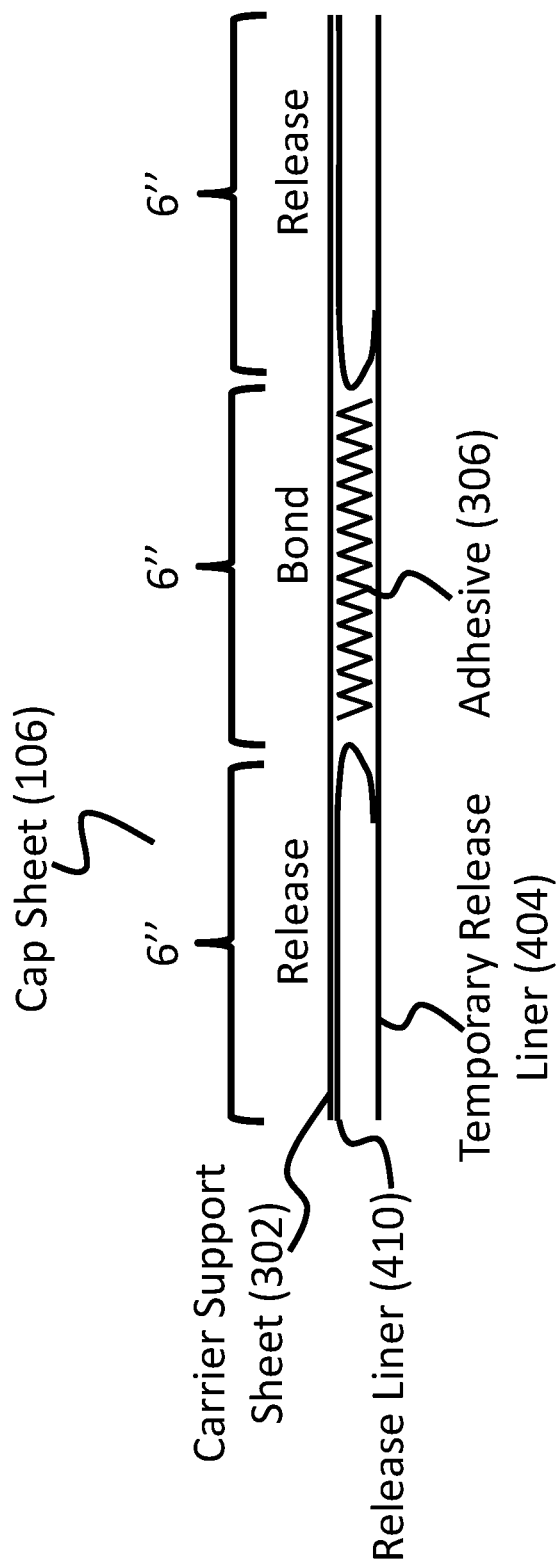
FIG. 8 is a front elevation view showing a cap sheet having a folded release liner, in accordance with embodiments of the present disclosure.

Now referring to FIG. 8, a front elevation view depicting a cap sheet 106 having a folded release liner 410, in accordance with embodiments of the present disclosure, is shown. In embodiments, to prevent compression forces from pressing the pressure sensitive material onto an exposed side of the release liner 410, the release liner 410 is folded onto itself, exposing the underside of the siliconized surface to any pressure sensitive material 306 that flows onto the release liner 410 at compression of the cap sheet 106 to the base sheet 104.

In embodiments, the cap sheet 106 release liner 410 is folded back onto itself where it meets the pressure-sensitive material 306, exposing part of the underside of the release liner 306 to the top side of the base sheet 104. This prevents any pressure-sensitive material 306 that flows onto the release liner 410 during the combining of the base sheet 104 and cap sheet 106 to form the multi-part underlayment 100, as disclosed herein, from preventing the release liner 410 from being easily removed by an installer in the field. Furthermore, this arrangement permits for only one side of the release liner 410 to be non-stick (e.g. siliconized) while providing the benefits of both top and bottom release liners 410.

In embodiments, the base sheet 104 is 48" wide.

In embodiments, cap sheets 106 are 18" wide.

In embodiments, the combined cap sheet 106 is cut down the middle of each adhesively-bonded section and also down the center of the base sheet 104, providing four separate rolls of multi-part underlayment 100 in accordance with embodiments of the present disclosure.

In embodiments, a bottom portion of the base sheet 104, the portion opposite that on which the cap sheets 106 are adhered, is covered in a release liner 300.

In embodiments, the cap sheet 106 is manufactured without the use of a release liner 410. In such embodiments, a 36" cap sheet 106, for example, is sliced into two 18" top sheets using a combined total of 24" of release liner 410 and two 6" sections of pressure sensitive material 306 that require no release liner 410. The exposed, pressure sensitive material 306, in embodiments, has a compound or other agent added to its surface that permits for temporary rolling of the cap sheet 106, as would be known to one of ordinary skill in the art. The compound or agent is then neutralized and the adhesive properties of the pressure sensitive adhesive 306 restored with the addition of heat, a cleaning agent, roller pressure, by adding an additional product to restore the adhesive qualities of the pressure sensitive material 306, and/or other means, as would be known to one of ordinary skill in the art.

In embodiments, the cap sheet 106 is manufactured with a temporary release liner 404 and an exposed, pressure-sensitive adhesive 306 in areas. In such embodiments, a temporary release sheet 404 is added onto the pressure sensitive material 306 and extends onto already-installed release liners 410. This temporary release sheet 404, in embodiments, is wider than the pressure sensitive material 306 it covers, making alignment less critical than if the liner was sized the same as the pressure-sensitive area.

In embodiments, this temporary release liner 404 is removed prior to compression, rolled-up, and reused, rendering the manufacturing process more environmentally friendly while also being more economical and allowing the use of a high quality temporary release liner 404 that would be cost-prohibitive if not reused.

In embodiments, the cap sheet 106 and base sheet 104 are manufactured using stacking equipment. More specifically, the equipment to manufacturer a base sheet 104 and a cap sheet 106 can be stacked while using the same or separate batches of pressure sensitive adhesives 306, allowing for the introduction of partial release liners 410 onto the cap sheet 106 without needing to roll the product prior to combining the base sheet 104 and cap sheet 106.

In yet another embodiment, the base sheet 104, in embodiments 48" in width, is manufactured using standard methods and is rolled and stored for later use, in embodiments on a base sheet winding roll 312. At the time of manufacturing the cap sheet 106 the base sheet winding roll 312 is introduced to the line at the point of discharge of the cap sheet 106 and combined therewith, avoiding the rolling of the cap sheet 106 onto a cap sheet winding roll 408.

The foregoing description of the embodiments of the present disclosure has been presented for the purposes of illustration and description. It is not intended to be exhaustive or to limit the present disclosure to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

What is claimed is:

1. A method of manufacture of a multi-part underlayment comprising a base sheet and a cap sheet that are combined to create a double layer hinge section as well as a single-layer nose section extending from the cap sheet, creating a pocket for holding flashing, the method comprising:
    producing the base sheet by:
        providing a carrier support sheet contained on a first base sheet roller;
        feeding the carrier support sheet through a series of rollers configured to place the carrier support sheet under tension;
        coating the carrier support sheet in a pressure sensitive adhesive;
        cooling the carrier support sheet;
        applying a base sheet release liner held by a second base sheet roller to the carrier support sheet;
        sizing the carrier support sheet to a predetermined size using at least one pair of base sheet sizing rollers creating a newly formed base sheet; and
        winding the newly formed base sheet on a base sheet winding roll;
    producing a cap sheet by:
        providing a second carrier support sheet contained on a first cap sheet roller;

feeding the second carrier support sheet through a series of rollers configured to place the second carrier support sheet under tension;

coating the second carrier support sheet in a pressure sensitive adhesive;

cooling the second carrier support sheet;

applying a cap sheet release liner held by a second cap sheet roller to the second carrier support sheet;

applying a temporary cap sheet release liner held by a third cap sheet roller to the second carrier support sheet; sizing the second carrier support sheet to a predetermined size using at least one pair of cap sheet sizing rollers creating a newly formed cap sheet; and winding the newly formed cap sheet on a cap sheet winding roll;

producing the multi-part underlayment by:

feeding the base sheet held on the base sheet winding roll through a series of rollers configured to place the base sheet under tension;

stripping the cap sheet held on the cap sheet winding roll of its temporary release liner using a temporary release liner recovery roller to recover the release liner; combining the cap sheet with the base sheet under pressure using at least one pair of final product sizing rollers creating a newly formed multi-part underlayment; and slitting the newly-formed multi-part underlayment into desired widths.

2. The method of claim 1, further comprising winding the multi-part underlayment on a winding roll.

3. The method of claim 1 wherein each pressure sensitive adhesive is Butyl.

4. The method of claim 1 wherein each pressure sensitive adhesive is Bitumen.

5. The method of claim 1 wherein the cap sheet release liner, base sheet release liner, and/or temporary cap sheet release liner are made of plastic.

6. The method of claim 5 wherein the plastic is a polyester.

7. The method of claim 6 wherein the polyester comprises at least one siliconized, non-stick surface.

8. The method of claim 5 wherein the plastic is a double siliconized polyester-based sheet.

9. The method of claim 5 further comprising folding the cap sheet release liner back onto itself where it meets the pressure-sensitive adhesive, exposing part of the underside of the cap sheet release liner to a top side of the base sheet.

10. A method of manufacture of a multi-part underlayment comprising a base sheet and a cap sheet that are combined to create a double layer hinge section as well as a single-layer nose section extending from the cap sheet, creating a pocket for holding flashing, the method comprising:

producing a base sheet by:

providing a carrier support sheet contained on a first base sheet roller;

feeding the carrier support sheet through a series of rollers configured to place the carrier support sheet under tension;

coating the carrier support sheet in a pressure sensitive adhesive;

cooling the carrier support sheet;

applying a base sheet release liner held by a second base sheet roller to the carrier support sheet; and sizing the carrier support sheet to a predetermined size using at least one pair of base sheet sizing rollers, creating the base sheet;

producing a cap sheet by:

providing a second carrier support sheet contained on a first cap sheet roller;

feeding the second carrier support sheet through a series of rollers configured to place the second carrier support sheet under tension;

coating the second carrier support sheet in a pressure sensitive adhesive;

cooling the second carrier support sheet;

applying a cap sheet release liner held by a second cap sheet roller to the second carrier support sheet;

applying a temporary cap sheet release liner held by a third cap sheet roller to the second carrier support sheet;

and sizing the second carrier support sheet to a predetermined size using at least one pair of cap sheet sizing rollers, creating a cap sheet;

producing the multi-part underlayment by:

feeding the base sheet through a series of rollers configured to place the base sheet under tension;

stripping the cap sheet of its temporary release liner using a temporary release liner recovery roller to recover the release liner;

combining the cap sheet with the base sheet under pressure using at least one pair of final product sizing rollers creating a newly formed multi-part underlayment; and slitting the newly-formed multi-part underlayment into desired widths.

11. The method of claim 10 wherein the base sheet and cap sheet are formed and combined using stacked manufacturing equipment.

12. The method of claim 10 further comprising folding the cap sheet release liner back onto itself where it meets the pressure-sensitive adhesive, exposing part of the underside of the cap sheet release liner to a top side of the base sheet.

13. The method of claim 10 wherein the cap sheet release liner, base sheet release liner, and/or temporary cap sheet release liner are made of polyester-based plastic.

* * * * *